United States Patent
Hsu

(10) Patent No.: US 11,124,258 B2
(45) Date of Patent: Sep. 21, 2021

(54) BICYCLE BOTTOM BRACKET SET

(71) Applicant: MING SUEY PRECISION INDUSTRIAL CO., LTD., Changhua County (TW)

(72) Inventor: Jia-Wei Hsu, Changhua County (TW)

(73) Assignee: MING SUEY PRECISION INDUSTRIAL CO., LTD., Changhua County (TW)

( * ) Notice: Subject to any disclaimer, the term of this patent is extended or adjusted under 35 U.S.C. 154(b) by 182 days.

(21) Appl. No.: 16/584,598

(22) Filed: Sep. 26, 2019

(65) Prior Publication Data

US 2020/0354009 A1 Nov. 12, 2020

(30) Foreign Application Priority Data

May 7, 2019 (TW) ................................ 108115739

(51) Int. Cl.
 *B62K 19/34* (2006.01)
(52) U.S. Cl.
 CPC .................................. *B62K 19/34* (2013.01)
(58) Field of Classification Search
 CPC ......... B62K 19/34; B62M 3/00; B62M 3/003; F16C 9/00; F16C 9/02; F16B 2/04; F16B 7/025; Y10T 403/4924
 See application file for complete search history.

(56) References Cited

U.S. PATENT DOCUMENTS

| | | | | |
|---|---|---|---|---|
| 4,810,040 A | * | 3/1989 | Chi | B60B 27/023 301/110.5 |
| 5,002,407 A | * | 3/1991 | Chi | B62K 19/34 301/110.5 |
| 5,181,437 A | * | 1/1993 | Chi | B62K 19/34 384/512 |
| 5,233,885 A | * | 8/1993 | Lin | B62K 19/34 384/512 |
| 5,476,327 A | * | 12/1995 | Chiang | B62M 3/003 384/545 |
| 5,549,396 A | * | 8/1996 | Chiang | B62M 3/003 384/540 |
| 5,690,432 A | * | 11/1997 | Lin | B62M 3/003 384/545 |
| 5,762,426 A | * | 6/1998 | Lin | B62M 3/003 384/458 |
| 5,980,116 A | * | 11/1999 | Chiang | B62M 3/003 384/538 |
| 6,938,516 B2 | * | 9/2005 | Yamanaka | B25B 15/005 411/374 |

(Continued)

*Primary Examiner* — Minnah L Seoh
*Assistant Examiner* — Michael R Stabley

(57) ABSTRACT

A bicycle bottom bracket set has two bearing cups, the bearing cup has a built-in ring, a tightening socket and a bearing. The built-in ring and the tightening socket are provided with a guiding end and a connecting portion. When the bearing cup screw is installed, the guiding end of the built-in ring can be gradually opened and pressed against the inner wall of the bottom bracket. When the bottom bracket has inner diameter offsets caused by the heat expansion and contraction factor or the poor processing, the combination of the forced tension of the bearing cup can achieve the purpose of structurally limiting. The stability of the structural installation while ensuring the safety of the structure.

2 Claims, 7 Drawing Sheets

(56) References Cited

U.S. PATENT DOCUMENTS

| | | | | |
|---|---|---|---|---|
| 7,234,373 | B2* | 6/2007 | Yamanaka | B25B 15/005 74/594.1 |
| 7,699,532 | B2* | 4/2010 | Lee | B62M 3/003 384/545 |
| 8,117,923 | B2* | 2/2012 | Sasaki | B62M 3/003 73/862.49 |
| 8,267,417 | B1* | 9/2012 | Yamanaka | B62M 3/003 280/259 |
| 8,393,794 | B1* | 3/2013 | Shiraishi | B62K 19/34 384/458 |
| 8,590,421 | B2* | 11/2013 | Meggiolan | B62M 3/003 74/594.1 |
| 9,004,771 | B2* | 4/2015 | Earle | B62M 3/003 384/458 |
| 9,517,811 | B1* | 12/2016 | Shiraishi | F16C 35/077 |
| 9,963,188 | B2* | 5/2018 | Gauthier | B62K 19/32 |
| 10,006,483 | B2* | 6/2018 | Hilgenberg | B62K 19/34 |
| 10,137,960 | B2* | 11/2018 | Gibbings | B60W 10/08 |
| 10,155,564 | B2* | 12/2018 | Shiraishi | B62K 19/34 |
| 10,689,048 | B2* | 6/2020 | D'Aluisio | B62K 19/36 |
| 2004/0045400 | A1* | 3/2004 | Alley | B62M 3/003 74/594.1 |
| 2008/0166075 | A1* | 7/2008 | Chang | F16C 35/077 384/94 |
| 2008/0247695 | A1* | 10/2008 | Yamanaka | F16C 3/08 384/458 |
| 2015/0329170 | A1* | 11/2015 | Kondo | B62M 3/003 74/594.1 |
| 2019/0225291 | A1* | 7/2019 | D'Aluisio | B62K 19/36 |

\* cited by examiner

BICYCLE BOTTOM BRACKET SET

BACKGROUND OF INVENTION

Field of Invention

The present invention relates to a bicycle bottom bracket set, and more particularly to a bicycle bottom bracket set with improved engagement.

Description of the Related Art

The bottom bracket set of the bicycle is mainly used for the installation of some main components such as the crank, the chain wheel and the axle. Therefore, the bottom bracket set with stable structure can improve the smoothness of the pedaling and effectively transmitting the pedaling force. However, there are many different structures of the bottom bracket sets such as press-fit type, thread-fit type, etc. . . . . As shown in FIGS. 6 and 7, a thread-fit type bottom bracket set 30 includes a neck bushing 31 and a threaded socket 32, and the neck bushing 31 is formed with a socket 311 at one end and a threaded section 312 on the other end. The threaded section 312 is engaged with the threaded socket 32, thereby placing the neck bushing 31 into the bottom bracket set 30. Therefore, the socket 311 is positioned at one end of the bottom bracket set 30, another end of the neck bushing 31 is locked to the threaded socket 32, and the socket 311 and the threaded socket 32 are closely engaged with the inner wall of the bottom bracket set 30, so that the bottom bracket set 30 is installed.

It is not difficult to find out that the above-mentioned conventional structure has some shortcomings. The main reason is as follows: The neck bushing 31 of the bottom bracket set 30 and the threaded socket 32 are locked together by the screw lock, and the socket 311 and the threaded socket 32 together are positioned inside the bottom bracket. However, the bottom bracket set 30 might have dimensional error due to thermal expansion and contraction factors or poor processing, which can be fixed by screwing. But in fact, a gap might still exist between the socket 311 and the outer peripheral sidewall of the threaded socket 32, therefore a bushing 33 is added between the socket 311 and the threaded socket 32 to fill-in the gap. However, the bushing 33 is made of plastic material which can have breakage or lack of shrinkage by external factors. The gap existing between the inner wall of the bottom bracket and the socket 311 and the threaded socket 32 can dramatically reduce the stability of the structure.

Therefore, it is desirable to provide a bicycle bottom bracket set to mitigate and/or obviate the aforementioned problems.

SUMMARY OF THE INVENTION

An objective of present invention is to provide a bicycle bottom bracket set, which is capable of improving the above-mention problems.

In order to achieve the above mentioned objective, a bicycle bottom bracket set has two bearing cups respectively disposed at two ends of a bottom bracket and connected to a neck bushing. Each bearing cup has at least a built-in ring, a tightening socket and a bearing. The built-in ring is jacketed by the bottom bracket, and the built-in ring provided with an inner threaded section and a guiding end having a tapered sidewall. The guiding end is evenly provided with a plurality of grooves, and the tightening socket is provided with an outer threaded section engaging the built-in ring and a connecting portion larger than the outer threaded section. The connecting portion is further provided with an expanded circular lip adjacent to the outer threaded section, another end of the connecting portion is provided with a positioning lip pushing against the bottom bracket, and the tightening socket is provided with an accepting space for accepting the bearing.

Other objects, advantages, and novel features of invention will become more apparent from the following detailed description when taken in conjunction with the accompanying drawings.

DETAILED DESCRIPTION OF THE PREFERRED EMBODIMENT

Figure 1:
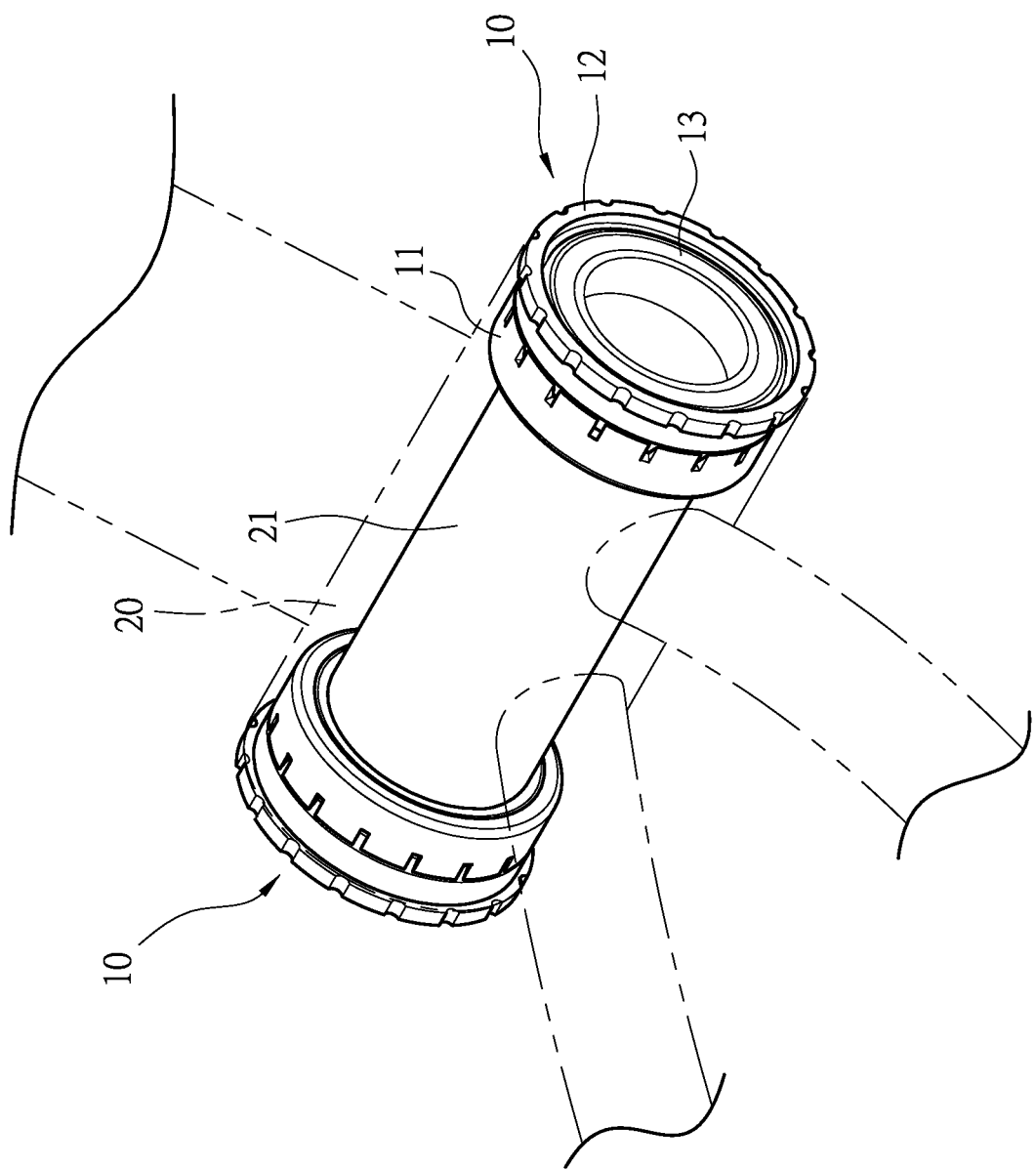
FIG. 1 is a perspective view of a preferred embodiment according to the present invention.
Figure 2:
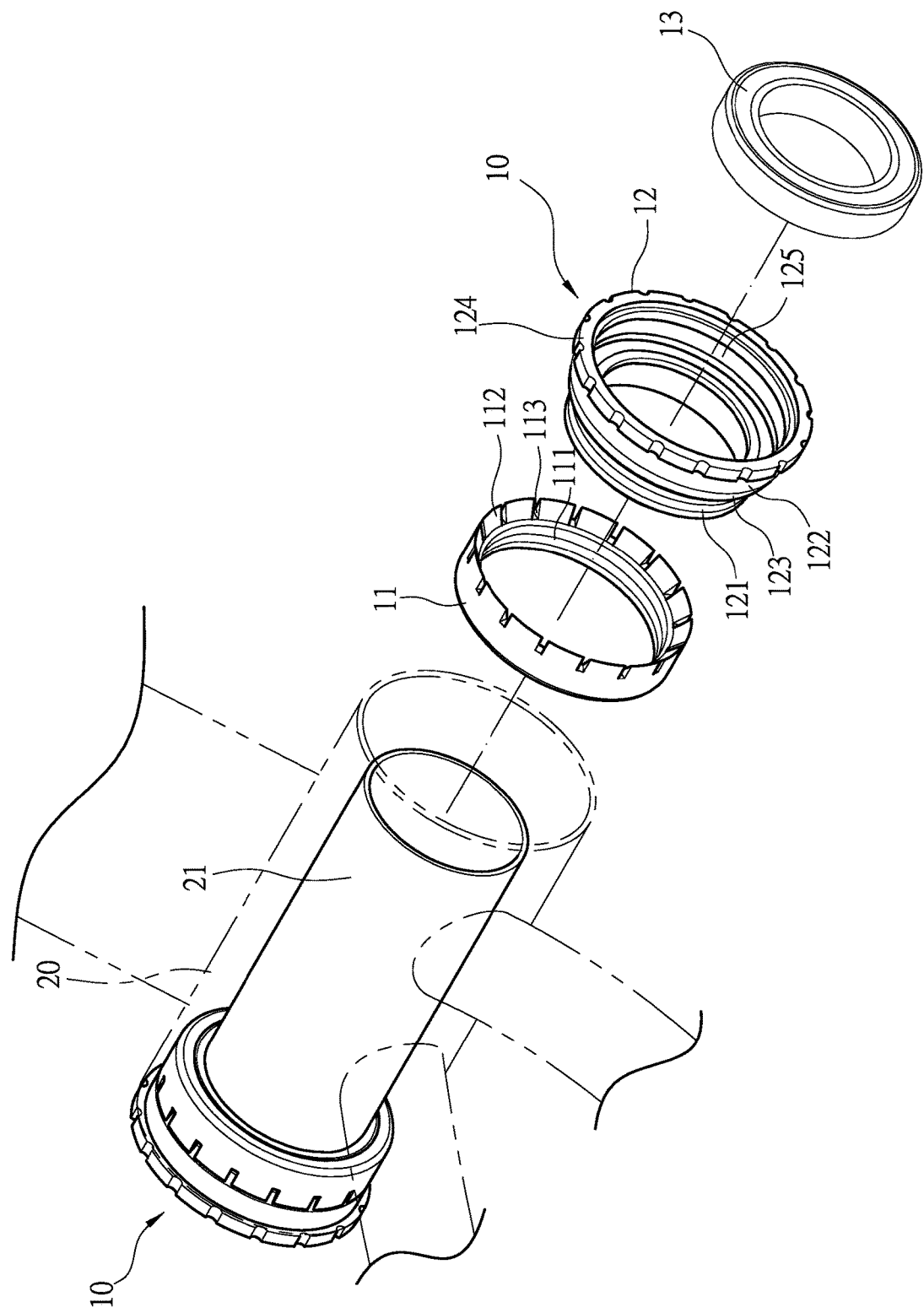
FIG. 2 is an exploded view of the preferred embodiment according to the present invention
Figure 3:
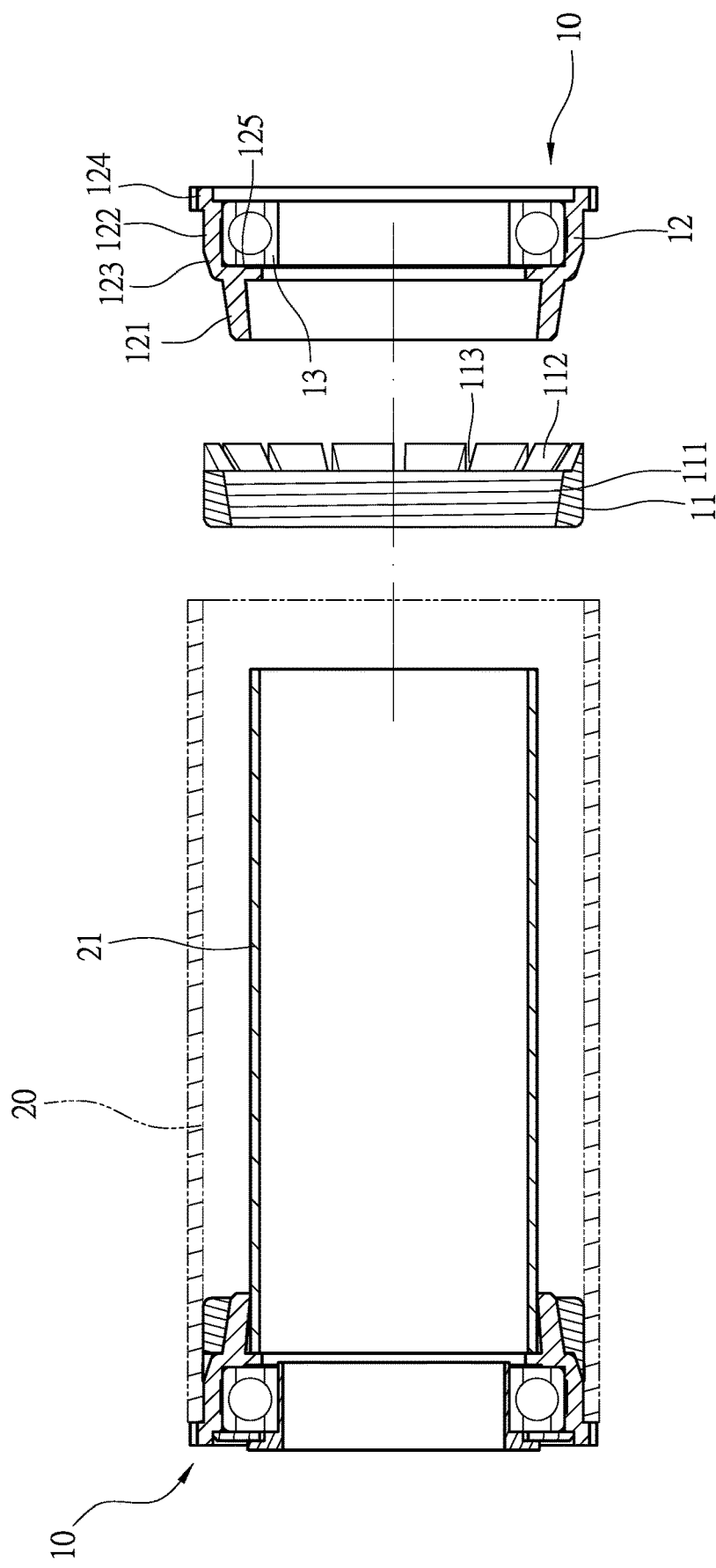
FIG. 3 is an exploded cross-sectional view of the preferred embodiment according to the present invention.
Figure 4:
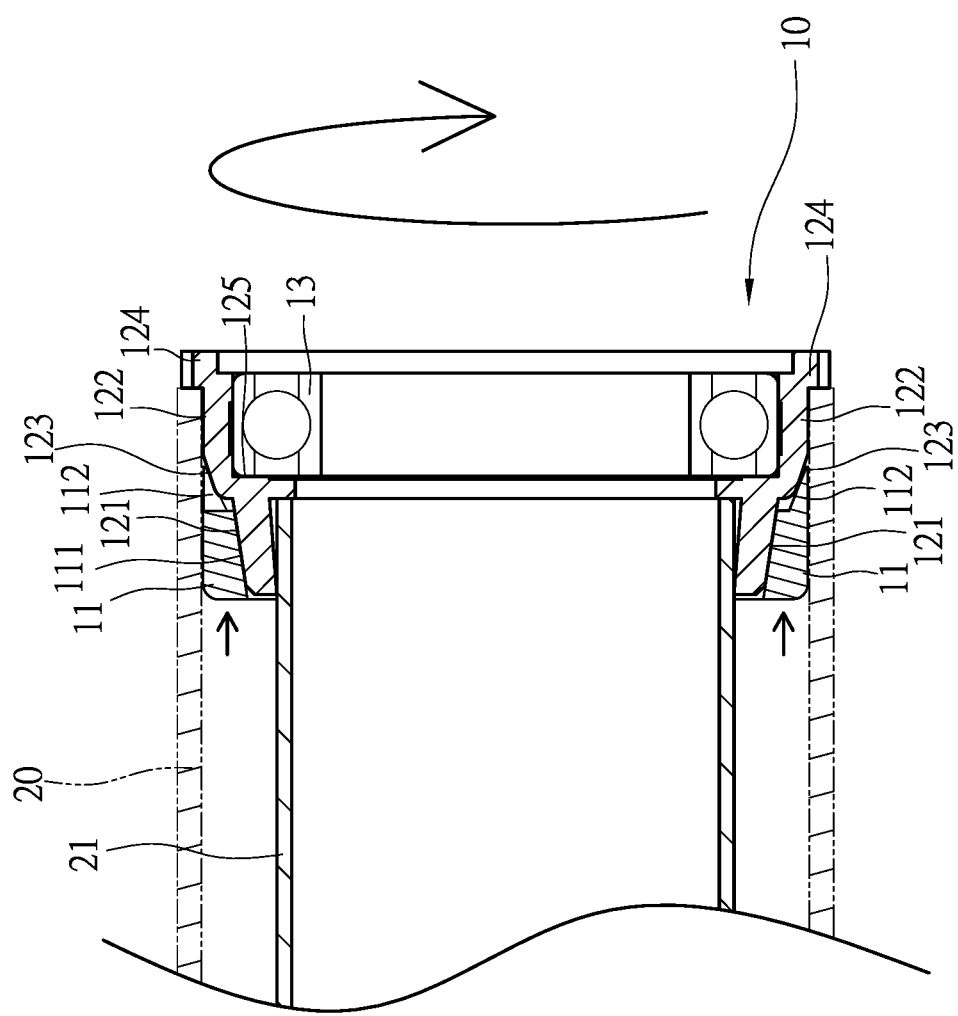
FIG. 4 is a cross-sectional view of the combination of the preferred embodiment according to the present invention.
Figure 5:
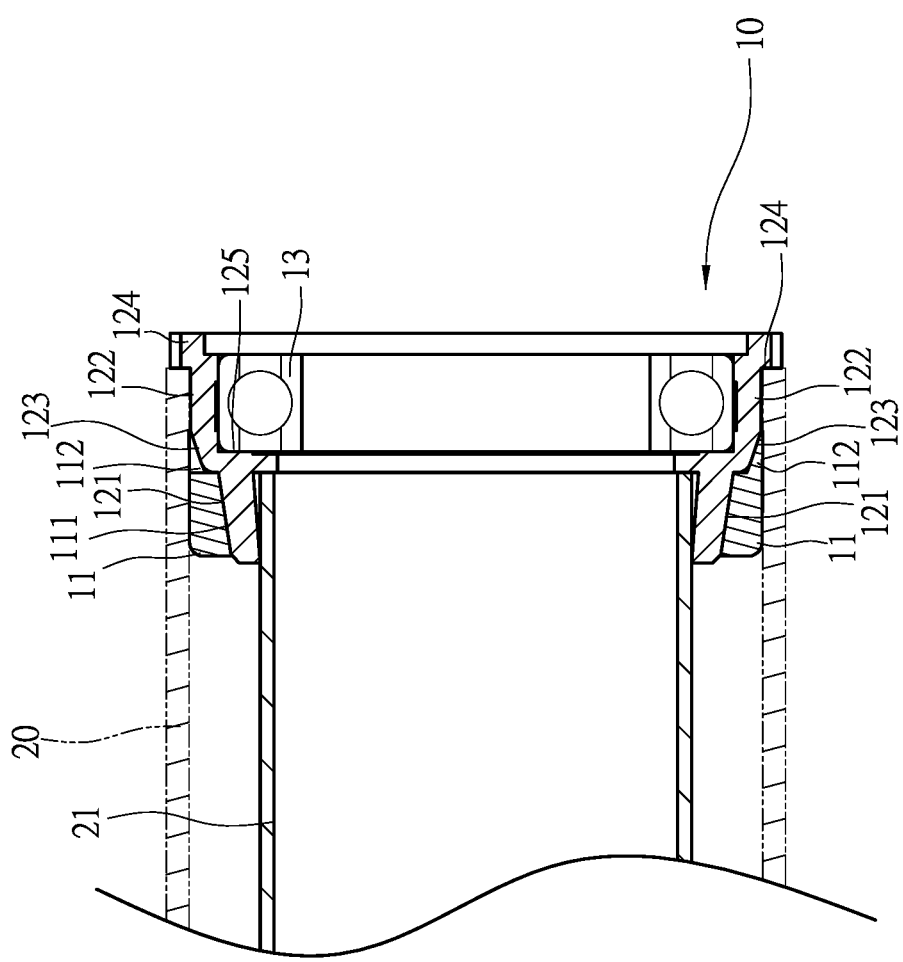
FIG. 5 is a cross-sectional view showing the engagement of the preferred embodiment according to the present invention.
Figure 6:
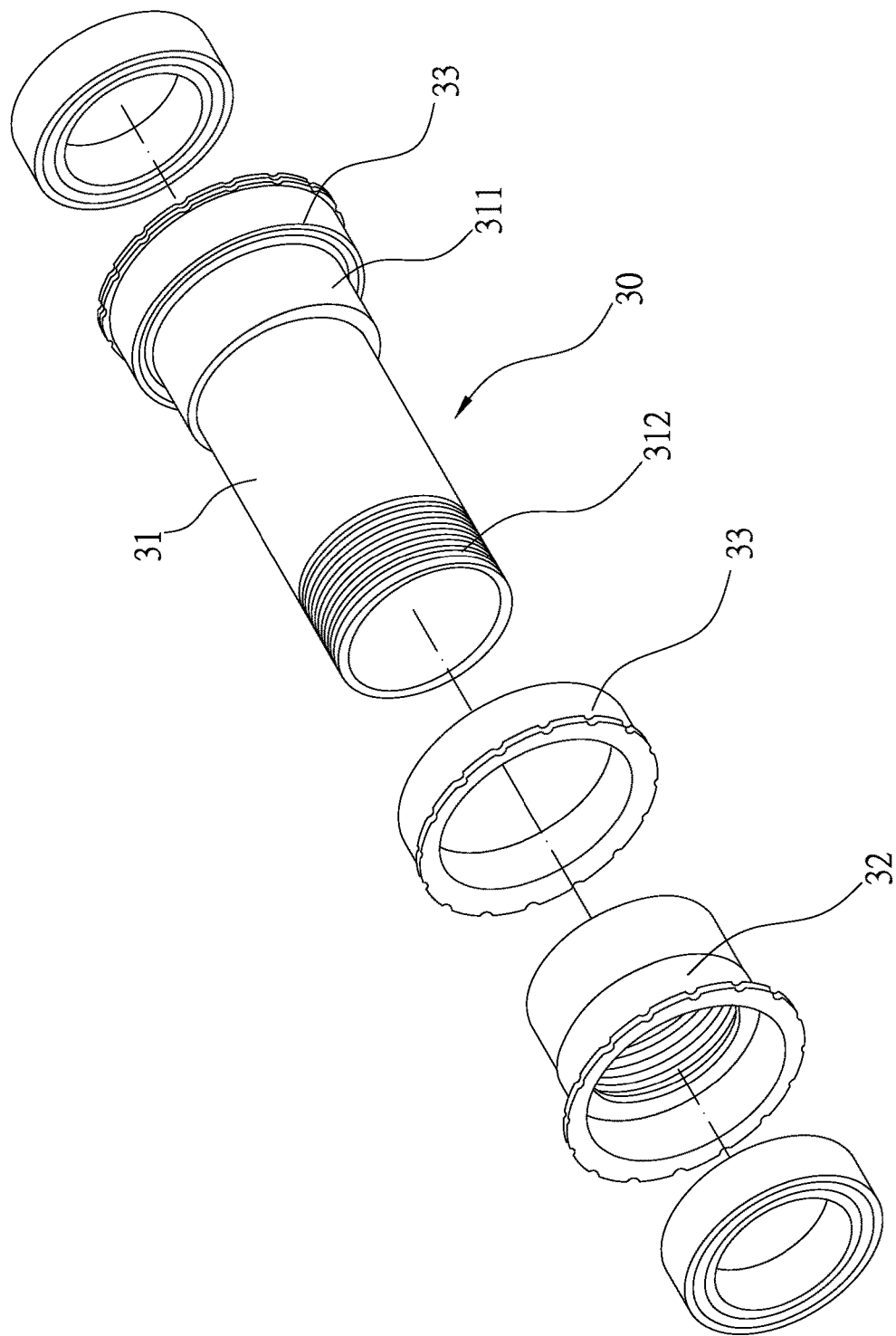
FIG. 6 is an exploded view of the prior art.
Figure 7:
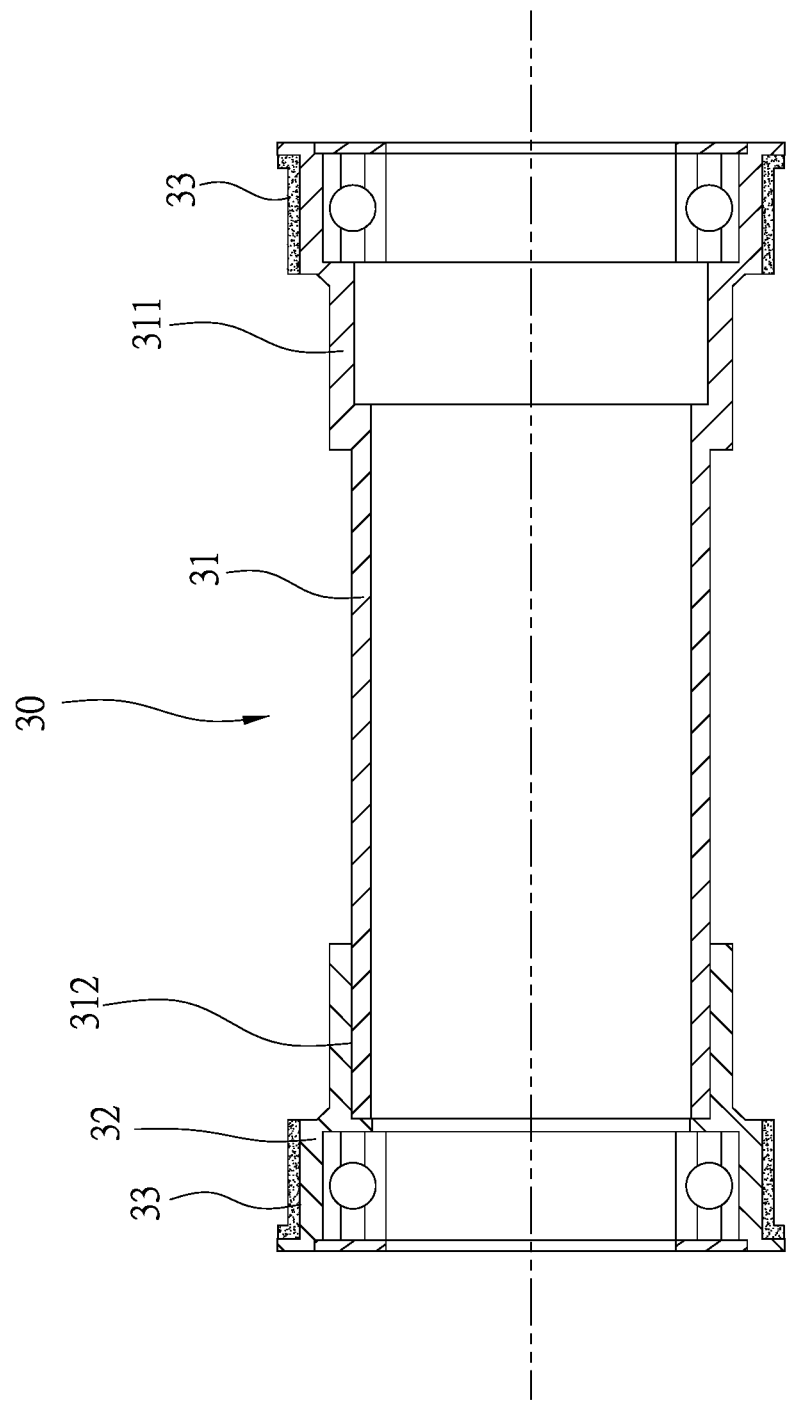
FIG. 7 is a cross-sectional view of the combination of the prior art.

Please refer to FIGS. 1-3. A bicycle bottom bracket set comprises: two bearing cups 10 respectively disposed at two ends of a bottom bracket 20 and connected to a neck bushing 21, each bearing cup 10 comprises a built-in ring 11, a tightening socket 12 and a bearing 13. The built-in ring 11 is jacketed by the bottom bracket 20, and the built-in ring 11 is provided with an inner threaded section 111 and a guiding end 112 having a tapered sidewall. The inner threaded section 111 is further provided with an inclined circular sidewall, and the outer threaded section of the tightening socket corresponds to the inclined circular sidewall of the inner threaded section, and the guiding end 112 is evenly provided with a plurality of grooves 113. The tightening socket 12 provided with an outer threaded section 121 engaging the built-in ring 11, and the outer threaded section 121 is also provided with an inclined circular sidewall corresponding to the inner threaded section 111. The tightening socket 12 is further provided with a connecting portion 122 larger than the outer threaded section 121. The connecting portion 122 is provided with an expanded circular lip 123 adjacent to the outer threaded section 121. Another end of the connecting portion 122 is provided with a positioning lip 124 pushing against the bottom bracket 20. The tightening socket 12 is provided with an accepting space 125 for accepting the bearing 13.

For the structure of the structure, please refer to FIGS. 2, 3, 4, and 5. Two ends of the bottom bracket 20 is respectively coupled with a bearing cup 10, and the guiding end 112 of the built-in ring 11 of each bearing cup 10 faces the tightening socket 12, and the inner and outer threaded sections 111, 121 lock the bearing cup 10 and the tightening socket 12 together. Afterward, the bearing 13 is embedded in the accepting space 125 of the tightening socket 12, so the two bearing cup 10 respectively mounted onto the two ends of the bottom bracket 20. The outer peripheral of the built-in ring 11 is jacketed by the bottom bracket 20, the connecting portion 122 is embedded in the bottom bracket 20, and the positioning lip 124 pushes against the outer end of the bottom bracket 20. Finally, the tightening sockets 12 of the bearing cups 10 are tightened, so that each built-in ring 11 moves along the threaded section 121 of the tightening socket 12 towards the connecting portion 122, and the guiding end 112 of the built-in ring 11 is gradually touching the expanded lip 123 of the connecting portion 122 to expand. Therefore, the outer wall of the guiding end 112 is outwardly pushed by the inner wall of the bottom bracket 20 to achieve the tight engagement of the two bearing cups 10 and complete the installation of the bottom bracket set.

With the structure of the above specific embodiment, the following benefits can be obtained: the guiding end 112 and the connecting portion 122 are provided between the built-in ring 11 and the tightening socket 12 of the two bearing cup 10, when the bowl 10 is screwed, the guiding end 112 of the built-in ring 11 can be expanded and press against the inner wall of the bottom bracket 20. When the bottom bracket 20 has different inner diameter sizes due to thermal expanded or contracted or poor processing, by tightening the bearing cup 10 the structure is secured to avoid the abnormal sound caused by shaking, so the stability of the structural installation is greatly improved, and the safety of the structure is ensured.

Although the present invention has been explained in relation to its preferred embodiment, it is to be understood that many other possible modifications and variations can be made without departing from the spirit and scope of invention as hereinafter claimed.

What is claimed is:

1. A bicycle bottom bracket set comprising: two bearing cups respectively disposed at two ends of a bottom bracket and connected to a neck bushing, each bearing cup comprising at least a built-in ring, a tightening socket and a bearing; the built-in ring jacketed by the bottom bracket, and the built-in ring provided with an inner threaded section and a guiding end having a tapered sidewall; the guiding end evenly provided with a plurality of grooves, the tightening socket provided with an outer threaded section engaging the built-in ring and a connecting portion larger than the outer threaded section; the connecting portion further provided with an expanded circular lip adjacent to the outer threaded section, another end of the connecting portion provided with a positioning lip pushing against the bottom bracket, and the tightening socket provided with an accepting space for accepting the bearing.

2. The bicycle bottom bracket set as claimed in claim 1, wherein the inner threaded section of the built-in ring is further provided with an inclined circular sidewall, and the outer threaded section of the tightening socket corresponds to the inclined circular sidewall of the inner threaded section.

* * * * *